United States Patent Office 2,942,522
Patented June 28, 1960

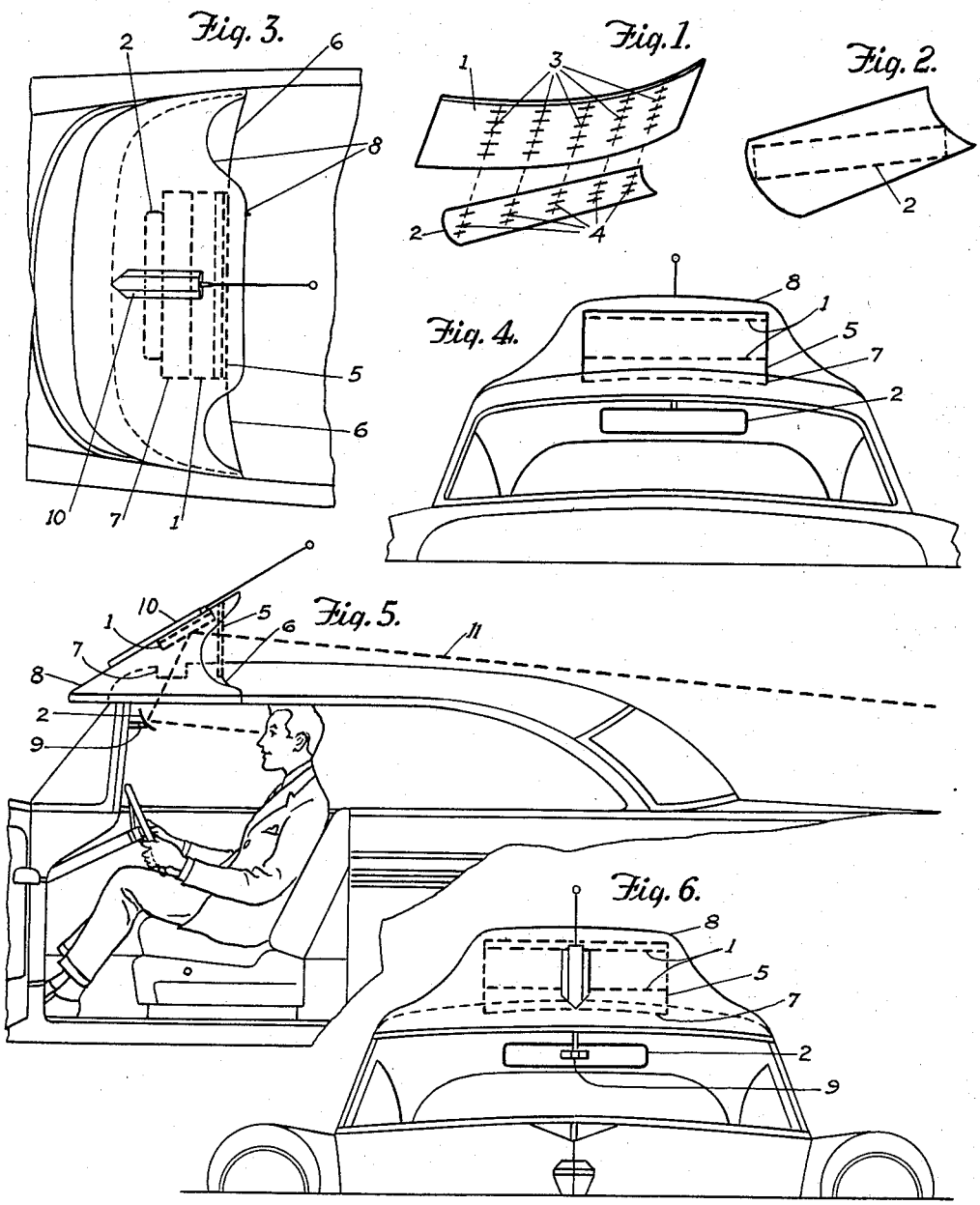

2,942,522

REAR VIEW DEVICE

James E. Merriam, 22124 Violet Ave.,
St. Clair Shores, Mich.

Filed Apr. 18, 1956, Ser. No. 579,089

1 Claim. (Cl. 88—86)

This invention relates to a periscope device and more particularly to a rear view device for automotive vehicles.

As the average road speed of automotive vehicles increases so does the driver's need to have a clear view of the area surrounding the rear of his car increase. Also the design requirements of modern vehicles for aesthetic appearance minimizes the value of the traditional type of singular reflector rear view mirrors. Modern design often requires that the rear roof panels of a car slope down at relatively low angle to the ground whereby the effective vertical area of the rear window is decreased and the driver's effective range of rear vision is deminished.

It is therefore an object of the present invention to provide a rear view device for automotive vehicles which is not dependent upon the automobiles rear window area for providing an effective range of rear vision.

Another disadvantage that results from the use of the traditional single reflector rear view device in modern automobiles is the fact that when a passenger is sitting in the center of either the front seat or the rear seat his head blocks the driver's vision. In older cars it was possible for the mirror to receive the reflection above the occupant's head, but today's modern design requires that the head room be no greater than that which is absolutely necessary for the passenger's comfort.

It is therefore a further object of the present invention to provide a rear view device for automotive vehicles which is not dependent upon the space between the passenger's head and the roof of the vehicle for effective operation.

In the past rear view devices have been proposed that remedy the objection to the single reflector type now in common use in a variety of manners. But because of the need for bringing the rear image to the driver's eyes in a simple yet effective manner no satisfactory solution to the problem has yet been reached. As is proven by the continued use of the single central reflector.

It is therefore an object of the present invention to provide a rear view device for automotive vehicles which is relatively simple in construction, susceptible to economic manufacture, and adaptable to a wide range of automotive vehicles. These objects are achieved in the present invention and are incorporated in a device which may be adapted to existing automotive designs without decreasing the aesthetic appearance of those designs. In the preferred embodiment, the present invention comprises of a rectangular mirror horizontally disposed which is shaped in a convex manner along its length, a second rectangular horizontally aligned mirror having a substantially concave section along its width; and a means for mounting and adjusting the two mirrors relative to one another so as to give the driver a range of rear vision that is required by modern road conditions.

Other objections, applications, and advantages of the present invention will be made apparent by the following detailed description of a preferred embodiment of the invention. The detailed description makes reference to the accompanying drawings in which:

Figure 1 is a perspective view of the combination of reflective devices used in the preferred embodiment;

Figure 2 is a perspective view indicating the manner in which one of the reflectors shown in Figure 1 is formed;

Figure 3 is a planned view of a top of the automobile showing the complete assembly;

Figure 4 is an elevation view taken from the rear of the automobile showing the reflector housing mounted on the top of the automobile;

Figure 5 is a partial side elevation view of an automobile having reflective equipment embodying the present invention;

And Figure 6 is a front elevation view of an automobile embodying the present reflective equipment.

Referring to Figure 1, the reflective device employs a first rectangular mirror 1 which is formed with a convex curvature in its longitudinal direction. This mirror is mounted above the car and is convex so as to reflect the wide range of images that is necessary to communicate information to the driver about all objects in the rear of the car.

The second rectangular mirror 2 is concave along its width. Its particular shape is necessary so that it will invert those images reflected from the mirror 1 so as to furnish them to the driver in an upright manner. Figure 2 illustrates the manner in which the mirror 2 is formed. Because of the angle made by a line from the driver's head to the mirror 2 with respect to an axial line to the car the mirror 2 must be cut along an angle from a normally concave stock. It is therefore concave along a diagonal axis. It is believed that this particular form of construction is necessary so that the focal points of all the images reflected from the mirror 1 by the mirror 2 will be in a plane which is perpendicular to the driver's line of vision.

The points 3 represent a variety of images reflected by the mirror 1. They are in turn reflected to the mirror 2 as shown at points 4. Referring to Figure 5 the mirror 2 is mounted on a bracket 9 that allows it to be raised, lowered or moved longitudinally to accommodate driver's having various height of vision. Mirror 1 is mounted on the roof of the vehicle above the driver's position. A metal housing 8 provides a mounting space for the mirror 1 so that it may reflect its image through a hole 7 in the roof of the vehicle to reflect the proper range of objects in the mirror 2. The housing 8 extends over the windshield of the car to act as a sun visor. A glass cover 5 is mounted in a vertical position at the rear edge of the metal housing 8 and serves to protect both the reflectors 1 and 2 from the effect of snow, rain and dirt. The metal enclosure 6 seals the edges of the clear glass 5 against the housing 8. The housing 8 is swept back along its rear edge to allow for the removal of snow and ice that might collect there. An antenna 10 may be mounted on the housing 8 to add to its aesthetic effect. The appearance of the device is also heightened by the fact that the housing 8 extends the entire width of the car roof. The hole 7 is so positioned as to allow defrosting air which travels up the windshield of the car to strike against the mirror 1 so as to remove any moisture that collects upon it. It is therefore seen that the present invention provides a highly effective means of presenting a wide panorama of rear view conditions to the driver's attention. This convenience and safety necessity is provided in a simple and economical manner and the structure is such to allow the device to be combined with the automobile in an aesthetic manner.

Having thus described my invention I claim:

A rear view device for automotive vehicles, comprising in combination: a first, rectangular, cylindrically convex reflector supported above the roof of the vehicle with the longitudinal axis of the rectangle disposed normally to the center line of the vehicle and with the center line of said cylindrical curvature being inclined with respect to the vertical; an enclosure mounted on said roof and so disposed as to cover said mirror; an aperture in the roof of the vehicle below said first reflector; a second, rectangular, cylindrically concave reflector having its cylindrical axis approximately coincident with the diagonal of its rectangle, said second reflector being disposed along the center line of said vehicle directly below said aperture and being so displaced as to project an image received from said first reflector to a driver of the vehicle seated at a point displaced from the center line of said vehicle and to the rear of said second reflector.

References Cited in the file of this patent

UNITED STATES PATENTS

| | | |
|---|---|---|
| 2,322,231 | Fischer | June 22, 1943 |
| 2,346,739 | Ewing | Apr. 18, 1944 |
| 2,569,576 | Ramme | Oct. 2, 1951 |

FOREIGN PATENTS

| | | |
|---|---|---|
| 108,315 | Great Britain | Jan. 24, 1918 |
| 78,482 | Sweden | Apr. 23, 1932 |
| 856,724 | Germany | Nov. 24, 1952 |